United States Patent
Ballas et al.

(10) Patent No.: US 7,057,364 B2
(45) Date of Patent: Jun. 6, 2006

(54) ACTUATION SYSTEM COMPRISING A DIGITAL POSITION SENSOR

(75) Inventors: Gérard Ballas, Culoz (FR); Christophe Nicot, Quintal (FR)

(73) Assignee: S.N.R. Roulements, Annecy Cedex (FR)

( * ) Notice: Subject to any disclaimer, the term of this patent is extended or adjusted under 35 U.S.C. 154(b) by 0 days.

(21) Appl. No.: 10/727,086

(22) Filed: Dec. 4, 2003

(65) Prior Publication Data
US 2004/0201356 A1 Oct. 14, 2004

(30) Foreign Application Priority Data
Dec. 4, 2002 (FR) .................................. 02 15280

(51) Int. Cl.
*G05B 5/00* (2006.01)

(52) U.S. Cl. ...................... 318/466; 318/592; 318/593; 318/594; 318/601

(58) Field of Classification Search ................ 318/466, 318/592, 593, 594, 595, 601, 613, 648, 599, 318/574, 570; 364/167
See application file for complete search history.

(56) References Cited

U.S. PATENT DOCUMENTS

| | | | |
|---|---|---|---|
| 4,264,850 A * | 4/1981 | Cannon et al. | 318/574 |
| 4,312,033 A * | 1/1982 | Sweeney et al. | 700/56 |
| 5,532,583 A * | 7/1996 | Davis et al. | 324/202 |

* cited by examiner

*Primary Examiner*—Karen Masih
(74) *Attorney, Agent, or Firm*—Arent Fox PLLC

(57) ABSTRACT

An actuating system having an electric motor that is controlled by a computer as a function of a setpoint position of a member that is to be actuated. The actuating system includes an encoder that is dependent on the movement of the motor, a sensor designed to deliver two square digital position signals in quadrature and which are representative of the position of the encoder, a device for processing the signals and which can determine the actual position of the encoder, and a device for comparing the actual position of the encoder with the position of the encoder that corresponds, in theory, to the applied setpoint. The actuating system can be used to actuate a member and/or actuate a device that meters the amount of fuel provided to a heat engine.

14 Claims, 3 Drawing Sheets

ACTUATION SYSTEM COMPRISING A DIGITAL POSITION SENSOR

BACKGROUND OF THE INVENTION

1. Field of the Invention

The invention relates to a system for actuating a member and methods of using the system to actuate the member. The invention also relates to using the system for actuating a device to meter fuel in a heat engine, such as, for example, an aeronautical turbine engine.

2. Description of Related Art

It is known to use an actuating system comprising an electric motor, for example, a stepping-type electric motor, which includes a device for transmitting the movement of the electric motor to a valve that supplies fuel to the heat engine. The electric motor is controlled by a computer that is configured to regulate the current supplied to the electric motor as a function of a setpoint position of the valve. The setpoint position is derived from an acceleration command initiated by the pilot of the plane having the heat engine, to supply a desired amount of fuel to the heat engine.

It has been proposed to make such actuation safer by comparing the actual movement of the electric motor with a movement corresponding, theoretically, to the applied setpoint, to detect, in real time, any anomaly in the actuation.

To accomplish such, it has been proposed to measure the actual movement of the electric motor using a resolver-type sensor, which delivers information about the absolute angle of the rotor of the electric motor in the form of analog signals.

The integration of a resolver-type sensor in an actuating system poses many problems. For example, resolver-type sensors are particularly bulky and relatively heavy due to the technology used to provide the sensors, which requires a rotor and a stator that may have a number of wire windings wound around a metal core.

Moreover, the volume needed to integrate the resolver-type sensors often requires the sensors be mounted on a rotor parallel to the electric motor. Consequently, particularly in the case of small actuating systems, the sensor becomes a bulky component of the electric motor and significantly contributes to the total mass of the actuating system.

Furthermore, since the position information delivered by the resolver-type sensor is analog in nature, the actuating system must include an analog/digital conversion stage at the input of the computer to make use of the position information.

Moreover, particularly in the context of the use under consideration, it is indispensable to obtain reliable and precise actuation, and to do so under use conditions that are severe in terms of vibrations, temperatures and pressures.

Resolver-type sensors do not optimally satisfy the constraints, particularly in terms of reliability, due to the large number of elements of which they are composed and the presence of an additional analog/digital conversion stage within the computer.

The same is true of resistive-type sensors, the reliability of which is highly affected by severe use conditions.

BRIEF SUMMARY OF THE INVENTION

It is an aspect of the present invention to address the above-mentioned problems. In particular, it is an aspect of the present invention to provide an actuating system which delivers, in a precise and reliable manner, position information representative of the movements of the electric motor. The position information is in the form of digital signals and the system which delivers the information is easily integrated into the actuating system.

According to another aspect of the present invention, an actuating system is provided, which includes an electric motor controlled by a computer configured to regulate the current supplied to the electric motor as a function of a setpoint position of the member that is to be actuated. The actuating system also includes a device for transmitting the movement of the electric motor to the member. The transmission device includes an encoder that is dependent on the movement of the electric motor. The encoder includes a main multipolar track. The system further includes a fixed sensor having at least two sensitive elements arranged to face the main track with an air-gap between the elements and the main track. The fixed sensor is designed to deliver two square digital position signals in quadrature and representative of the position of the encoder. A device for processing the signals includes counting means for determining, from an initial position, the actual position of the encoder. A device compares the actual position of the encoder with the position of the encoder that corresponds, in theory, to the applied setpoint.

According to one embodiment of the present invention, the comparison device includes alert means which, upon determination of a significant difference between the actual position and the theoretical position, is designed to emit a signal indicating an anomaly in the operation of the actuating system.

According to another aspect, the present invention includes a method of actuating a member using the actuating system. The method includes the iterative steps of inputting the setpoint position of the member to the computer; determining the actual position of the encoder; comparing the actual position of the encoder with the position of the encoder corresponding, in theory, to the applied setpoint; and activating the alert means when the difference between the actual position and the theoretical position is greater than a predetermined threshold amount.

According to another embodiment of the present invention, the comparison device includes an actuation feedback loop controlled as a function of the determined difference between the actual position and the theoretical position.

According to a third aspect, the present invention includes a method of actuating a member using the actuating system. The method includes the iterative steps of inputting the setpoint position of the member to the computer; determining the actual position of the encoder; comparing the actual position of the encoder with the position of the encoder corresponding, in theory, to the applied setpoint; and controlling the feedback loop wherein a setpoint position associated with the difference between the actual position and the theoretical position is supplied to the computer when the difference is greater than a predetermined threshold amount.

According to yet another aspect of the present invention, the actuating system is used to actuate a device for metering fuel in a heat engine.

Other aspects and advantages of the invention will emerge from the following description, given with reference to the appended drawings.

DETAILED DESCRIPTION OF THE PREFERRED EMBODIMENTS

Figure 1:
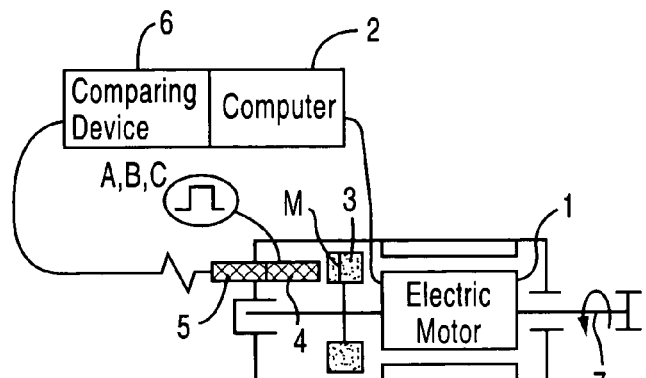
FIGS. 1–2 are schematic diagrams of a rotating actuating system according to a first and a second embodiment of the present invention.

The invention relates to an actuating system comprising an electric motor 1, for example, a stepper-type motor, which is controlled by a computer 2 configured to regulate a current supplied to the motor 1 as a function of a setpoint position of a member to be actuated.

The member is actuated by a device which transmits the movement of the motor 1 to the member to be actuated. The actuation is obtained by controlling the motor 1 with a setpoint position of the member to be actuated, the setpoint position being selected, based on the type of the transmission device used, to move the member to a desired position.

In one exemplary use, the actuating system actuates a device which meters an amount of fuel provided to a heat engine, such as, for example, an aeronautics turbine. For this purpose, a transmission device facilitates actuating a valve which supplies fuel to the heat engine, wherein the setpoint position is derived from an acceleration command provided by the pilot flying the plane having the heat engine.

In order to determine an actual movement of the transmission device that is induced by the setpoint, an encoder 3, having a main multipolar track M that is dependent on the movement of the motor 1, is integrated into the actuating system and a sensor 4, which can deliver two digital signals representative of the position of the encoder 3, and hence, of the movements of the electric motor 1.

In one exemplary embodiment, the encoder 3 is formed of a multipolar magnetic part on which a plurality of magnetized pairs of north and south poles are equally distributed with a constant angular width between neighboring poles to form the main track M. In another exemplary embodiment, the encoder 3 is formed of an elastomeric part which is charged with magnetic particles, such as, for example, with ferrite, such as barium ferrite or strontium ferrite.

The sensor 4 is fixed and includes at least two sensitive elements that are arranged to face the main track M with an air-gap AG defined between the sensitive elements and the main track M, to deliver two periodic electrical signals S1, S2 in quadrature. The sensor 4 also includes means for digitizing the signals S1, S2, wherein two square digital position signals A, B are delivered in quadrature, wherein the signals are representative of the position of the encoder 3.

In one exemplary embodiment, the sensitive elements are chosen from a group including Hall probes, magnetoresistors and giant magnetoresistors.

The manner in which the signals S1 and S2 are obtained from the plurality of sensitive elements is described, for example, in Applicant's FR-2 792 403. In particular, this embodiment makes it possible to obtain position signals which do not depend on the amplitude of the read magnetic field; which are insensitive to the air-gap variations due to the movement of the encoder 3; and which are also insensitive to the decrease in the magnetic field due to the temperature.

However, sensors 4, having two sensitive elements that deliver the signals S1 and S2, are known. According to one embodiment, as described, for example, in FR-2 754 063, the sensor 4 includes means for interpolating the signals which make it possible to increase the resolution of the output digital signals A, B, so as to be able to use a smaller number of pairs of poles. Thus, it is possible to use a high level of magnetic induction, wherein it becomes possible to increase the robustness of the actuating system's operation with respect to the severe use conditions as well as the resolution of the position signals, and to do so without increasing the bulk of the encoder 3.

The actuating system further includes a device for processing the signals A, B, the device including counting means for determining, from an initial position, the actual position of the encoder 3.

In one exemplary embodiment, the counting means includes a register within which the value of the position of the encoder 3 is increased or decreased by an incremental value corresponding to the number of fronts of signals A, B which are detected.

As shown in FIGS. 1, 2, 3a and 3b, the sensor 4 and the processing device 5 may be integrated and provided on a silicon substrate or the like, for example, an AsGa substrate, to form an integrated circuit customized for a specific application, wherein the circuit is sometimes referred to as an ASIC to denote an integrated circuit that is designed in whole or in part as a function of requirements.

According to a first embodiment, the initial position is fixed at zero when the actuating system is set in operation. Thus, the processing device 5 enables the relative position of the encoder 3 with respect to the initial position to be known. In other words, the distance separating the position of the encoder 3 from any initial position, which may vary with respect to a fixed reference point.

According to a second embodiment, the processing device 5 is designed to deliver the absolute position of the encoder 3. Absolute position is understood to mean the distance separating the position of the encoder 3 at a given instant from a reference position of the encoder 3 with respect to a fixed reference position. For this purpose, the system includes means for determining a reference position, and the processing device 5 includes means which, upon detection of the reference position, assigns the reference position as the initial position.

According to the first embodiment, the means for determining the reference position is integrated in the encoder 3. For this purpose, the encoder 3 also includes a singularity that is indexed to a reference position of the encoder 3. The sensor also includes at least one sensitive element designed to detect the singularity of the encoder 3. In particular, the encoder 3 may include the main multipolar track M or a top tour track T, the track M or T being provided with the singularity. At least one sensitive element is arranged to face the track M or T across the air-gap AG defined between the sensitive element and the track M or T to deliver a digital signal C having a pulse. The processing device 5 includes means which, upon detection of the pulse, assigns the reference position as an initial position. An exemplary manner of obtaining the digital signals A, B and C, and various ways of realizing a magnetic singularity, are described in FR-2 769 088 and EP-0 871 014. In particular, the magnetic singularity of the track M or T may be formed of two adjacent poles, the magnetic transition of which is different from the others.

According to a second embodiment, the means for determining the reference position are integrated in the transmission device. For this purpose, the transmission device may include a stop that is designed to interrupt the movement of the motor 1 in a reference position of the encoder 3, and the processing device 5 may include means which, upon interruption of the movement, assigns the reference position as the initial position.

Although the description is given in relation to an encoder/magnetic sensor assembly, it is also possible to implement the invention analogously using an equivalent technology, such as, for example, the optical type. For example, the encoder 3 may be formed of a metal or glass target on which the main track M and possibly the top track T have been engraved to form an optical motif that is analogous to the multipolar magnetic motif described above, the sensitive elements then being formed of optical detectors.

The actuating system also includes a device 6 for comparing the actual position of the encoder 3, that is to say the position determined by the processing device 5, with the position of the encoder 3 that corresponds, in theory, to the applied setpoint. The comparison device 6 thus makes it possible to make the actuation safer by verifying, in real time, the correspondence between the movements of the electric motor 1 and the setpoint applied to the computer 2.

In an exemplary embodiment and as shown in FIGS. 1, 2, 3a and 3b, the comparison device 6 is integrated or provided within the computer 2 and includes a comparator for making a comparison between the position signal coming from the processing device 5 and the position signal derived from the setpoint. The integration being particularly simple and reliable on account of the digital nature of the two types of signal.

According to another exemplary embodiment, the comparison device 6 includes alert means which, upon determination of a significant difference between the actual position and the theoretical position, is designed to emit a signal, for example, a light signal or audible signal, indicating an anomaly in the operation of the actuating system.

The method of actuating the member using such an actuating system includes the following iterative steps of inputting a setpoint position of the member to the computer 2; determining the actual position of the encoder 3; comparing the actual position of the encoder 3 with the position of the encoder 3 that corresponds, in theory, to the applied setpoint; and, if the difference between the actual position and the theoretical position is greater than a predetermined threshold value, activating the alert means.

According to another exemplary embodiment, the comparison device 6 includes, in addition to the alert means, an actuation feedback loop, which is controlled as a function of the determined difference between the actual position and the theoretical position. Thus, any anomaly in the operation of the actuating system is corrected by controlling the system in real time to position the encoder 3 in the setpoint position. As a modification to this embodiment, the processing device 5 may deliver signals which are representative of the speed of displacement of the encoder 3, with the signals being used in the feedback loop.

The method of actuating the member using such an actuating system includes the following iterative steps of inputting a setpoint position of the member to the computer 2; determining the actual position of the encoder 3; comparing the actual position of the encoder 3 with the position of the encoder 3 that corresponds, in theory, to the applied setpoint; and, if the difference between the actual position and the theoretical position is greater than a predetermined threshold value, controlling the feedback loop so as to apply to the computer 2 a position setpoint that is slaved to the difference.

In the exemplary embodiments described above, the methods may, where appropriate, include a step prior to the step of determining the initial position of the encoder 3. In particular, when the actuating system is in operation, the procedure may include a step of supplying the motor 1 with a current to position the encoder 3 in a reference position, the reference position being assigned in the processing device 5 as an initial position to subsequently determine the absolute position of the encoder 3.

Figure 2:
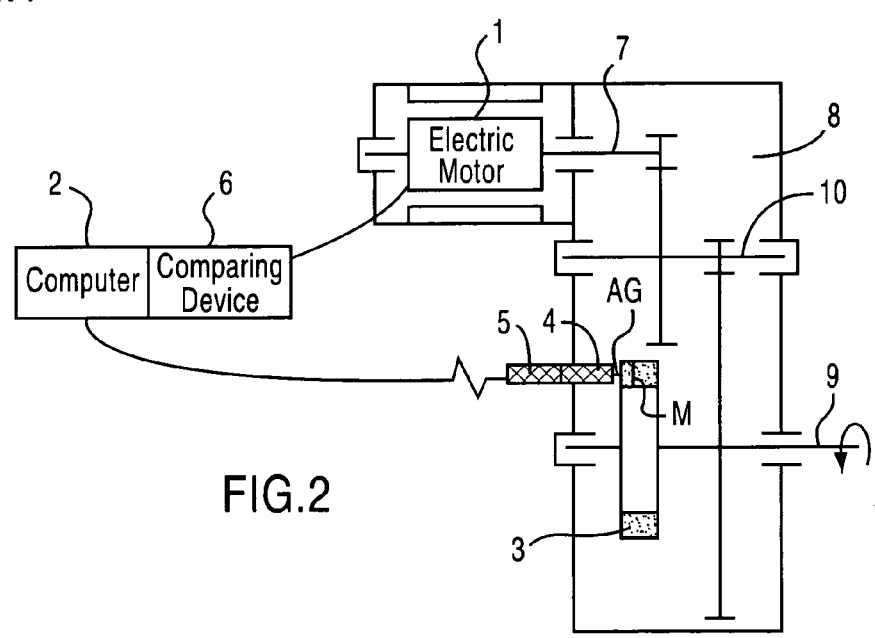

With reference to FIGS. 1–2, a description is given of a system for actuating a member in rotation.

According to the embodiment of FIG. 1, the transmission device includes the rotor 7 of the electric motor 1, wherein the encoder 3 is mounted on a part of the rotor that is opposite the member that is to be actuated.

According to the embodiment of FIG. 2, the transmission device includes a two-stage reducer 8, the encoder 3 being mounted on the output rotor 9 of the reducer. As a modification to such an embodiment, the encoder 3 may also be mounted on the rotor 7 of the electric motor 1 or on the input rotor 10 of the reducer 8.

In these two embodiments, the encoder 3, and hence, the 30 multipolar tracks, are circular, the encoder being, for example, annular in shape and including a bore that allows it to be connected to the rotor 7, 9.

Figure 3A:
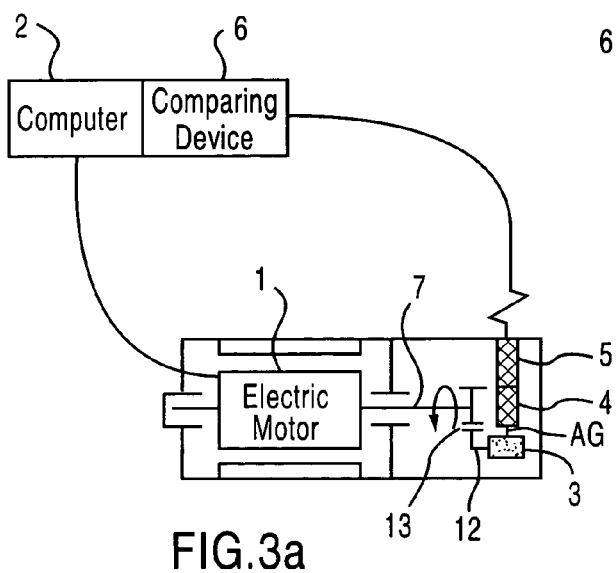
FIGS. 3a and 3b are schematic diagrams illustrating overhead and side views, respectively, of a translation actuating system according to another embodiment of the present invention.
Figure 3B:
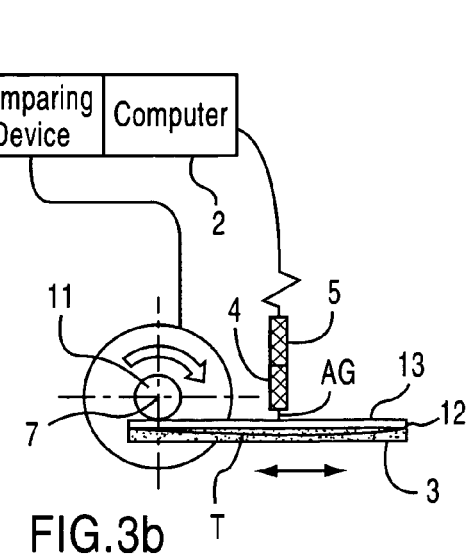

With reference to FIGS. 3a and 3b, a description is given of a system for actuating a member in translation. For this purpose, the transmission device includes the rotor 7, which is provided with a pinion 11 and a part 12 provided with a rack 13, which are designed to transform the rotary movement of the rotor 7 into a linear movement of the part 12, the encoder 3 being associated with the part. As a modification, the part 12 may form part of the member that is to be actuated.

In this embodiment, the encoder 3, and hence, the multipolar tracks, are linear, the encoder being, for example, molded with the part 12.

Figure 4:
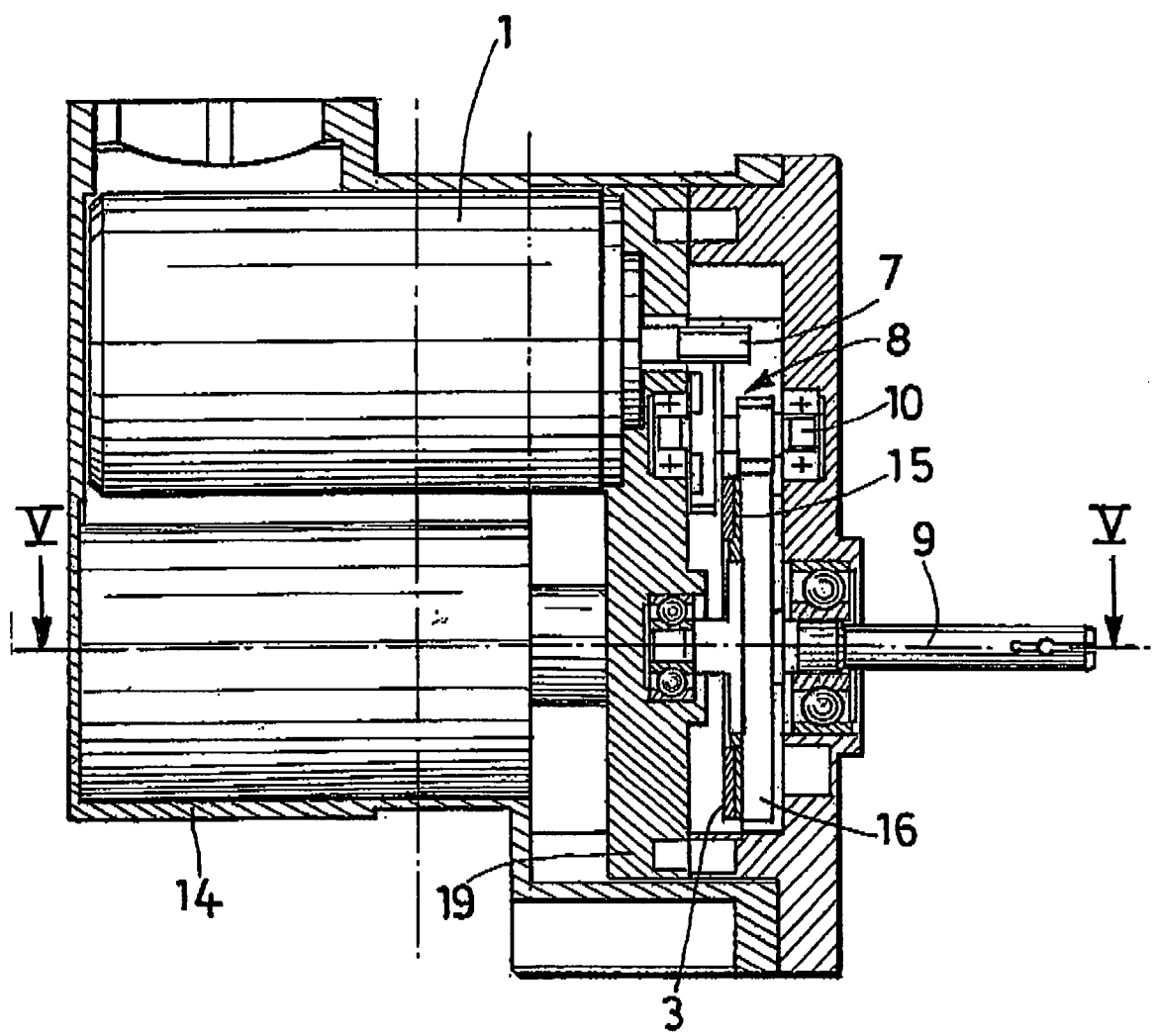
FIG. 4 is a longitudinal section view of an actuating system for a device that meters fuel in a heat engine.
Figure 5:
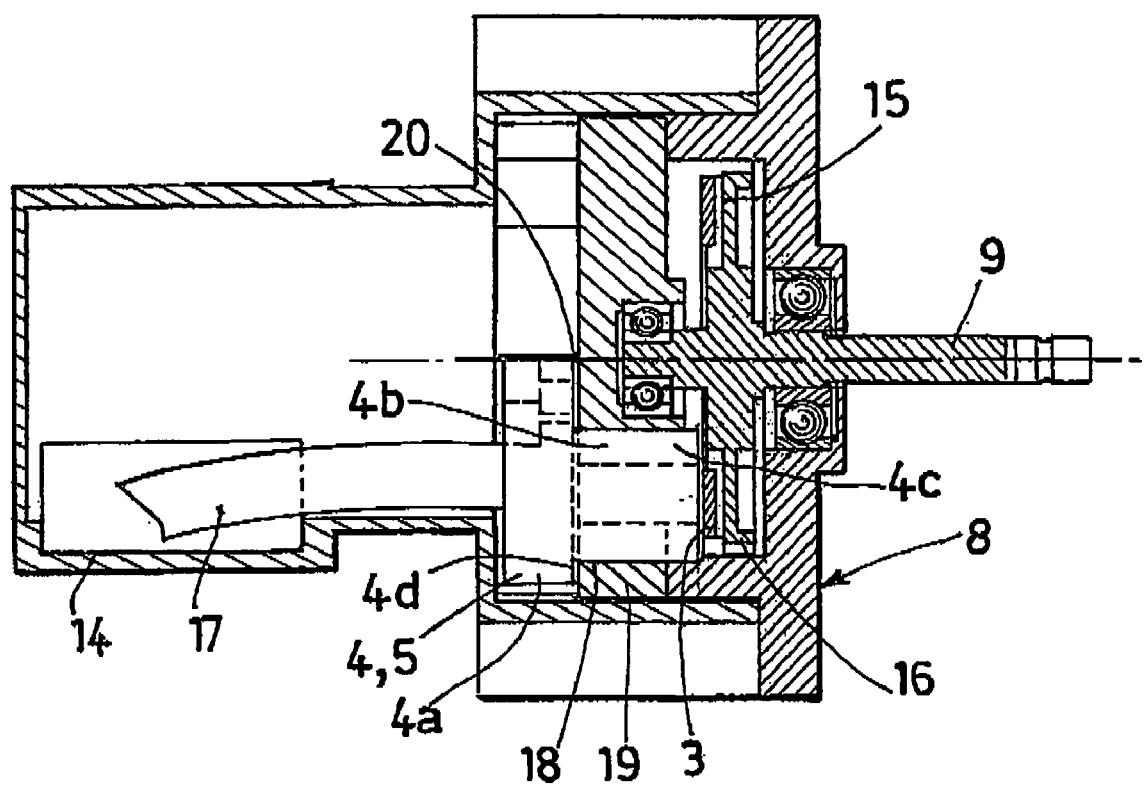
FIG. 5 is a sectional view taken along line V—V of FIG. 4.

With reference to FIGS. 4 and 5, a description is given of an actuating system for a device for metering fuel in a heat engine, which corresponds to the functional diagram of FIG. 2. For this purpose, the output rotor 9 includes a slot into which there is designed to be inserted the valve for supplying fuel to the metering device (not shown).

The actuating system includes a casing 14 in which the motor 1 and the reducer 8 are housed to form a single assembly.

The encoder 3 is fixed to an annular journal 15 of the gear wheel 16 which is associated with the output rotor 9. This embodiment permits integration of an encoder 3 having a large diameter, which makes it possible to improve the precision with which the position of the encoder is measured without increasing the size of the actuating system or requiring additional mechanical parts.

The sensor 4 is formed of a non-magnetic structural part in which the sensitive elements and the associated electronics are housed, the input/output connection of the sensor 4, which is formed of a multiconductor cable 17, projecting from the part to allow the connection of the sensor 4 to the computer 2.

The non-magnetic structural part includes a head 4a on a side face of which there extends a body 4b, the sensitive elements being disposed in the vicinity of the free side face 4c of the body 4b and the cable 17 extending from the side face of the head 4a that is opposite the body 4b. The part is designed so that the head 4a has, on the body side, a free side surface 4d.

The sensor 4 is fixed in a housing 18 of the casing 19 of the reducer 8, the housing being designed to receive the body 4b by pressing the free side surface 4d against the peripheral wall of the housing. Thus, the sensitive elements are precisely and reliably positioned to face the encoder 3 across an air-gap defined therebetween to be able to withstand severe use conditions. Furthermore, a wedge 20 may be placed between the peripheral wall of the housing and the free side surface 4b to regulate the air-gap distance.

The invention claimed is:

1. An actuating system for actuating a member, the actuating system comprising:
    a computer;
    an electric motor controlled by the computer, wherein the computer is configured to regulate a current supplied to the motor as a function of a setpoint position of the member to be actuated;
    a transmission device for transmitting a movement of the motor to the member, wherein the transmission device comprises an encoder that is dependent on the movement of the motor, said encoder comprising a main multipolar track and a singularity that is indexed to a reference position of the encoder;
    a fixed sensor comprising at least two sensitive elements arranged to face the main track across an air-gap defined between the fixed sensor and the main track and at least one sensitive element designed to detect the singularity, the fixed sensor being designed to deliver two square digital position signals in quadrature, wherein the signals are representative of a position of the encoder;
    a processing device for processing the signals, the device comprising counting means for determining, from an initial position, an actual position of the encoder, and means which, upon detection of the singularity, assigns the reference position as the initial position; and
    a comparison device for comparing the actual position of the encoder with a theoretical position of the encoder that corresponds to the applied setpoint position.

2. The actuating system according to claim 1, wherein the main track of the encoder is provided with the singularity and comprises a plurality of multipolar tracks, and wherein at least one sensitive element delivers a digital signal that comprises a pulse.

3. The actuating system according to claim 2, wherein each multipolar track is formed of a magnetic ring on which magnetized north and south poles are equally distributed with a constant angular width therebetween, the magnetic singularity of a top track of the plurality of multipolar tracks is formed of two adjacent poles, the magnetic transition of the top track being different from a remainder of the plurality of multipolar tracks.

4. The actuating system according to claim 1, wherein the sensitive elements of the fixed sensor are comprise one of Hall probes, magnetoresistors and giant magnetoresistors.

5. The actuating system according to claim 1, wherein the transmission device comprises a rotor of the motor on which the encoder is mounted.

6. The actuating system according to claim 1, wherein the transmission device comprises a reducer on a rotor on which the encoder is mounted.

7. The actuating system according to claim 1, wherein the transmission device comprises a rotor provided with a pinion and a part provided with a rack, wherein the rack and pinion are designed to transform a rotary movement of the rotor into a linear movement of the part, and wherein the encoder is associated with the part.

8. The actuating system according to claim 1, wherein the transmission device comprises a stop designed to interrupt the movement of the motor in a reference position of the encoder, and wherein the processing device comprises means which, upon interruption of the movement of the motor, assigns the reference position as an initial position.

9. The actuating system according to claim 1, wherein the comparison device comprises alert means which, upon determination of a significant difference between the actual position and the theoretical position, emits a signal indicating an anomaly in operation of the actuating system.

10. The actuating system according to claim 1, wherein the comparison device comprises an actuation feedback loop, which is controlled as a function of the determined difference between the actual position and the theoretical position.

11. A method of actuating a member using an actuating system including a computer; an electric motor controlled by the computer; a transmission device for transmitting a movement of the motor to the member; a fixed sensor designed to deliver signals representative of a position of the encoder; a processing device for processing the signals; and a comparison device comprising alert means which emits a signal indicating an anomaly in operation of the actuating system, wherein the method comprises the following iterative steps:
    inputting a setpoint position of the member into the computer;
    determining an actual position of the encoder;
    comparing the actual position of the encoder with a theoretical position of the encoder that is applied to the setpoint position; and
    activating the alert means when a difference between the actual position and the theoretical position is greater than a predetermined threshold value.

12. A method of actuating a member using an actuating system including a computer; an electric motor controlled by the computer; a transmission device for transmitting a movement of the motor to the member; a fixed sensor being designed to deliver signals representative of a position of the encoder; a processing device for processing the signals; and a comparison device comprising an actuation feedback loop, the method comprises the following iterative steps:
    inputting a setpoint position of the member into the computer;
    determining an actual position of the encoder;
    comparing the actual position of the encoder with a theoretical position of the encoder that is applied to the setpoint position; and
    if a difference between the actual position and the theoretical position is greater than a predetermined threshold value, controlling the feedback loop to apply to the computer a setpoint position that is slaved to the difference.

13. The method according to claim 11 or 12, comprising a step prior to determining the initial position of the encoder during which the motor is supplied with the current to position the encoder in the reference position, wherein during the prior step the reference position is assigned in the processing device as the initial position.

14. A method for actuating a fuel supplying device utilizing an actuating system including a computer; an electric motor controlled by the computer; a transmission device for transmitting a movement of the motor to the member; a fixed sensor designed to deliver signals representative of a position of an encoder; a processing device for processing the signals; and a comparison device for comparing an actual position of the encoder with a theoretical position of the encoder that corresponds to an applied setpoint position, the method comprising the following steps:

providing a heat engine;

actuating the device; and using the actuating system to supply a metered amount of fuel from the device to the heat engine.

* * * * *